US010659654B2

(12) United States Patent
Miura

(10) Patent No.: US 10,659,654 B2
(45) Date of Patent: May 19, 2020

(54) INFORMATION PROCESSING APPARATUS FOR GENERATING AN IMAGE SURROUNDED BY A MARKING ON A DOCUMENT, AND NON-TRANSITORY COMPUTER READABLE RECORDING MEDIUM THAT RECORDS AN INFORMATION PROCESSING PROGRAM FOR GENERATING AN IMAGE SURROUNDED BY A MARKING ON A DOCUMENT

(71) Applicant: KYOCERA DOCUMENT SOLUTIONS INC., Osaka (JP)

(72) Inventor: Tomohiro Miura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/864,897

(22) Filed: Jan. 8, 2018

(65) Prior Publication Data
US 2018/0198950 A1 Jul. 12, 2018

(30) Foreign Application Priority Data
Jan. 11, 2017 (JP) ................................ 2017-002505

(51) Int. Cl.
*H04N 1/40* (2006.01)
*H04N 1/387* (2006.01)
(Continued)

(52) U.S. Cl.
CPC ....... *H04N 1/3876* (2013.01); *G06K 9/00469* (2013.01); *G06K 9/18* (2013.01);
(Continued)

(58) Field of Classification Search
None
See application file for complete search history.

(56) References Cited

U.S. PATENT DOCUMENTS 4,667,248 A * 5/1987 Kanno .................... G06T 11/60
 358/451
5,701,500 A * 12/1997 Ikeo ........................ G06T 11/00
 382/180

(Continued)

FOREIGN PATENT DOCUMENTS

JP 1993-153365 A 6/1993
JP H09204511 A 8/1997

(Continued)

OTHER PUBLICATIONS

Japan Patent Office, Reason of Refusal dated Sep. 24, 2019.

*Primary Examiner* — Dung D Tran
(74) *Attorney, Agent, or Firm* — Li & Cai Intellectual Property (USA) Office

(57) ABSTRACT

An information processing apparatus includes: a memory; and a processor, in which the processor is configured to operate as an attribution area detection unit that detects an attribution area from a document image, the attribution area including an attribution image representing attribution information, an attribution image detection unit that detects the attribution image included in the attribution area, an attribution information extraction unit that extracts the attribution information represented by the attribution image, a marking detection unit that detects a marking image from an article area, the article area being an area excluding the attribution area in the document image, a marking area image generation unit that generates, from the document image, a marking area image surrounded by the marking image, and a combined image generation unit that combines the marking area image and a character string representing the attribution information to generate a combined image.

14 Claims, 5 Drawing Sheets

(51) Int. Cl.
*G06K 9/18* (2006.01)
*G06K 9/00* (2006.01)

(52) U.S. Cl.
CPC ......... *H04N 1/3871* (2013.01); *H04N 1/3873* (2013.01); *H04N 1/40062* (2013.01); *H04N 2201/0094* (2013.01)

(56) References Cited

U.S. PATENT DOCUMENTS

| | | | |
|---|---|---|---|
| 6,704,467 B2* | 3/2004 | Uchida | G06T 11/60 345/619 |
| 7,194,144 B1* | 3/2007 | Sakai | G06T 11/60 382/284 |
| 8,244,035 B2* | 8/2012 | Hamaguchi | G06K 9/00463 382/173 |
| 8,655,074 B2* | 2/2014 | Kim | G06K 9/00456 382/176 |
| 2002/0028020 A1* | 3/2002 | Fujiwara | G06K 9/00442 382/190 |
| 2006/0285746 A1* | 12/2006 | Yacoub | G06K 9/03 382/176 |
| 2008/0025606 A1* | 1/2008 | Hanano | G06K 9/2063 382/175 |
| 2017/0257520 A1* | 9/2017 | Miura | H04N 1/393 |

FOREIGN PATENT DOCUMENTS

| | | |
|---|---|---|
| JP | H10124615 A | 5/1998 |
| JP | 2002-150306 A | 5/2002 |
| JP | 2008204226 | 9/2008 |
| JP | 2015-045998 A | 3/2015 |

\* cited by examiner

INFORMATION PROCESSING APPARATUS FOR GENERATING AN IMAGE SURROUNDED BY A MARKING ON A DOCUMENT, AND NON-TRANSITORY COMPUTER READABLE RECORDING MEDIUM THAT RECORDS AN INFORMATION PROCESSING PROGRAM FOR GENERATING AN IMAGE SURROUNDED BY A MARKING ON A DOCUMENT

CROSS REFERENCE TO RELATED APPLICATION

This application claims the benefit of Japanese Priority Patent Application JP 2017-002505 filed Jan. 11, 2017, the entire contents of which are incorporated herein by reference.

BACKGROUND OF THE INVENTION

1. Field of the Invention

The present disclosure relates to an information processing apparatus and a non-transitory computer readable recording medium that records a program that can cut out an image surrounded by markings from a document image.

2. Description of Related Art

There is known a technology for cutting out an image surrounded by markings from a document image obtained by scanning a newspaper, a magazine, or the like.

It is desirable to improve user friendliness in an information processing apparatus and a program that cut out an image surrounded by markings from a document image.

SUMMARY OF THE INVENTION

An information processing apparatus according to an embodiment of the present disclosure includes: a memory that stores an information processing program; and a processor that executes the information processing program. When the processor executes the information processing program, the processor operates as an attribution area detection unit that detects an attribution area from a document image, the attribution area including an attribution image representing attribution information, an attribution image detection unit that detects the attribution image included in the attribution area, an attribution information extraction unit that extracts the attribution information represented by the attribution image, a marking detection unit that detects a marking image from an article area, the article area being an area excluding the attribution area in the document image, a marking area image generation unit that generates, from the document image, a marking area image surrounded by the marking image, and a combined image generation unit that combines the marking area image and a character string representing the attribution information to generate a combined image.

A non-transitory computer readable recording medium according to an embodiment of the present disclosure is a non-transitory computer readable recording medium that records an information processing program executable by a computer of an information processing apparatus, the information processing program causing the computer to operate as: an attribution area detection unit that detects an attribution area from a document image, the attribution area including an attribution image representing attribution information; an attribution image detection unit that detects the attribution image included in the attribution area; an attribution information extraction unit that extracts the attribution information represented by the attribution image; a marking detection unit that detects a marking image from an article area, the article area being an area excluding the attribution area in the document image; a marking area image generation unit that generates, from the document image, a marking area image surrounded by the marking image; and a combined image generation unit that combines the marking area image and a character string representing the attribution information to generate a combined image.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Hardware Configuration of Image Forming Apparatus

Figure 1:
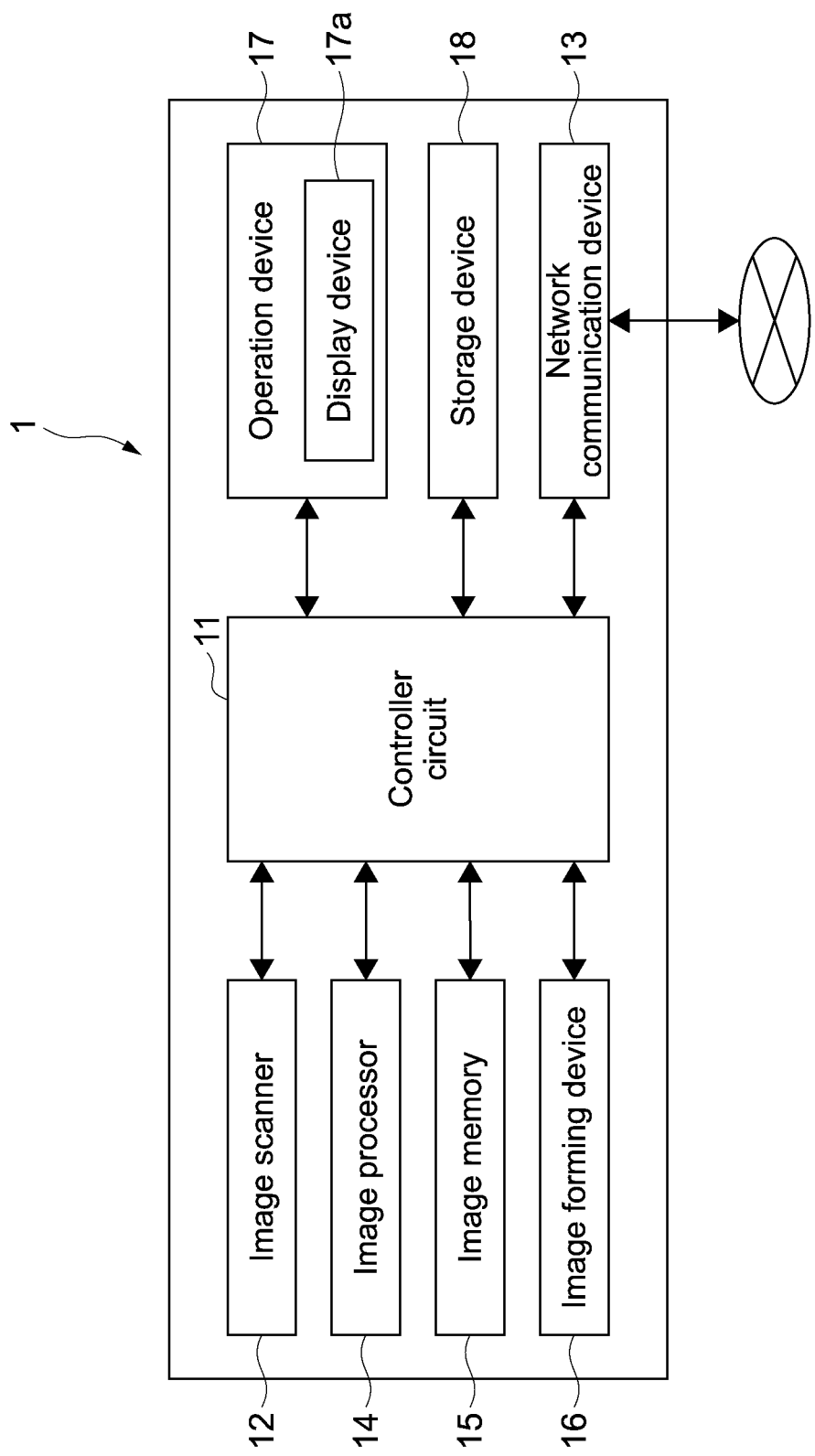
FIG. 1 shows a hardware configuration of an image forming apparatus according to an embodiment of the present disclosure.

FIG. 1 shows a hardware configuration of an image forming apparatus according to an embodiment of the present disclosure.

An information processing apparatus according to the embodiment of the present disclosure is an image forming apparatus (e.g., MFP; Multifunction Peripheral) and will hereinafter be referred to as MFP.

An MFP 1 includes a controller circuit 11. The controller circuit 11 includes a CPU (Central Processing Unit), a RAM (Random Access Memory), a ROM (Read Only Memory), dedicated hardware circuits, and the like and performs overall operational control of the MFP 1. A computer program that causes the MFP 1 to operate as the respective functional units (to be described later) is stored in a non-transitory computer readable recording medium such as a ROM.

The controller circuit 11 is connected to an image scanner 12, an image processor 14, an image memory 15, an image forming device 16, an operation device 17, a storage device 18, a network communication device 13, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a document image read by the image scanner 12 or data to be printed by the image forming device 16.

The image forming device 16 forms an image of image data and the like read by the image scanner 12.

The operation device 17 includes a touch panel device and an operation key device that accept user's instructions on various operations and processing executable by the MFP 1. The touch panel device includes a display device 17*a* such as an LCD (Liquid Crystal Display) equipped with a touch panel.

The network communication device 13 is an interface used for connecting to the network.

The storage device 18 is a large-volume storage device such as an HDD (Hard Disk Drive) that stores a document image read by the image scanner 12, and the like.

2. Functional Configuration of Image Forming Apparatus

Figure 2:
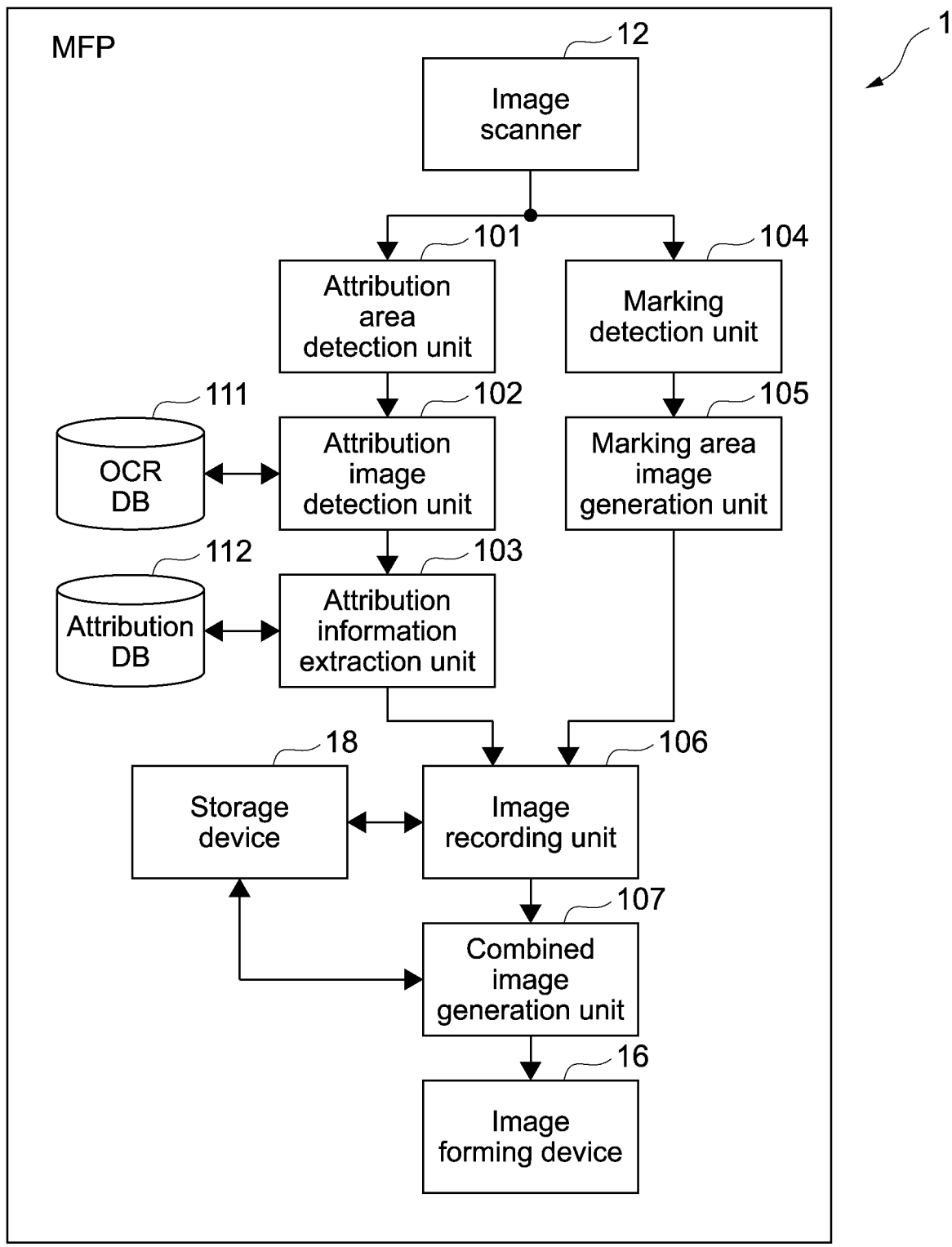
FIG. 2 shows a functional configuration of the image forming apparatus.

FIG. 2 shows a functional configuration of the image forming apparatus.

The CPU (processor) of the MFP 1 loads an information processing program recorded in a ROM (memory), which is an example of a non-transitory computer readable recording medium, in a RAM and executes the program to thereby operate as the functional blocks, i.e., an attribution area detection unit 101, an attribution image detection unit 102, an attribution information extraction unit 103, a marking detection unit 104, a marking area image generation unit 105, an image recording unit 106, and a combined image generation unit 107.

The attribution area detection unit 101 detects an attribution area from a document image, and cuts out the detected attribution area.

The attribution image detection unit 102 detects, from the attribution area cut out by the attribution area detection unit 101 from the document image, an attribution image included in the attribution area.

The attribution information extraction unit 103 extracts attribution information represented by the attribution image detected by the attribution image detection unit 102.

The marking detection unit 104 detects a marking image from an article area that is an excluding the attribution area in the document image.

The marking area image generation unit 105 cuts out, from the document image, an image surrounded by the marking image detected by the marking detection unit 104 to generate a marking area image.

The image recording unit 106 records the marking area image generated by the marking area image generation unit 105 and a character string representing the attribution information extracted by the attribution information extraction unit 103 in association with each other.

The combined image generation unit 107 combines the marking area image generated by the marking area image generation unit 105 and the character string (text) representing the attribution information extracted by the attribution information extraction unit 103 to generate a combined image. The combined image generation unit 107 outputs the generated combined image to the image forming device 16, and causes the image forming device 16 to print the combined image.

3. Operational Flow of Image Forming Apparatus

Figure 3:
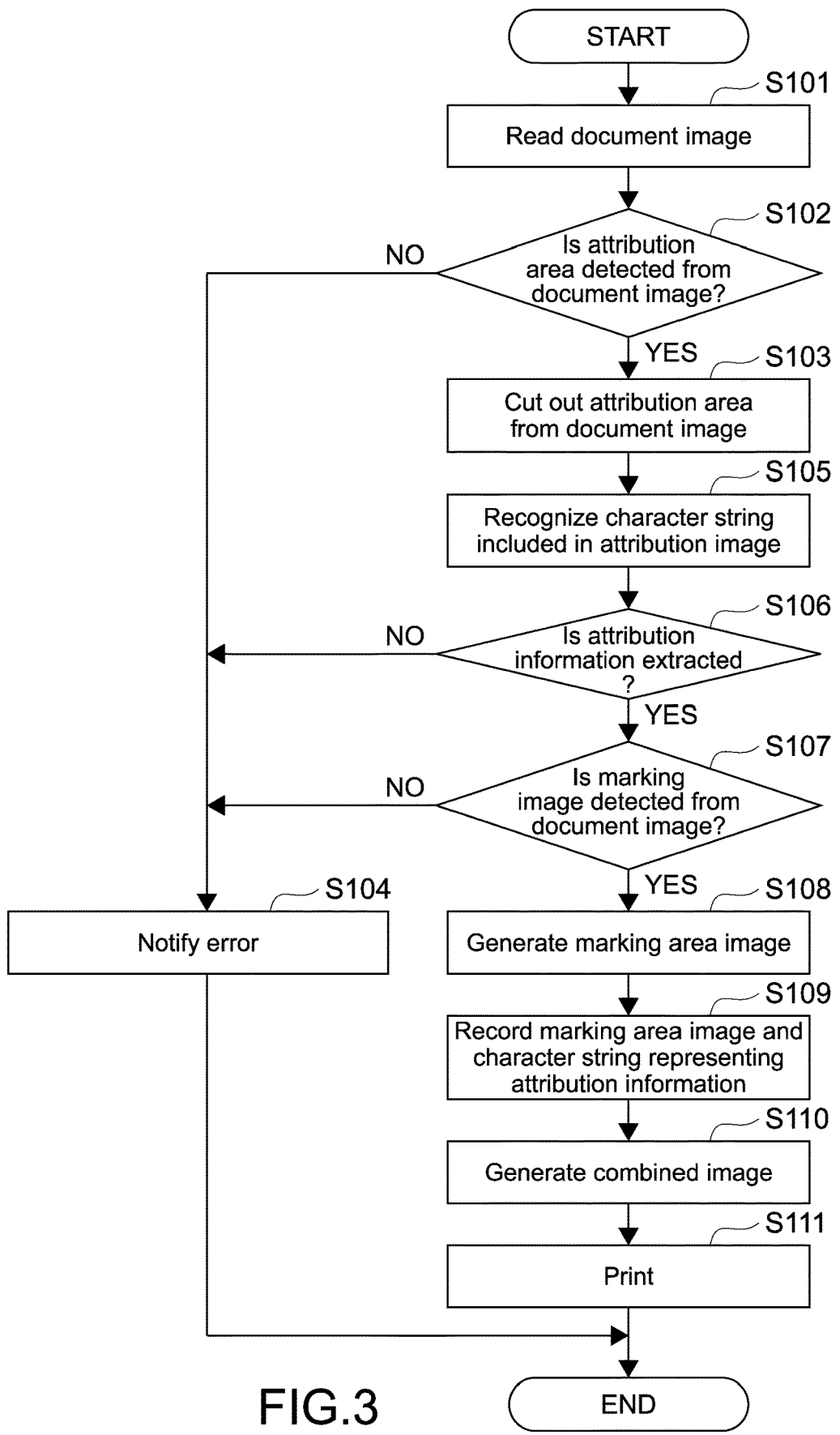
FIG. 3 shows an operational flow of the image forming apparatus.

FIG. 3 shows an operational flow of the image forming apparatus.

As a presupposition, a marking is put on some articles of a document (typically, newspaper) by a user using a fluorescent marker pen or the like. The marking is put so as to surround an article with frame lines. In other words, the marking is not a line segment or the like, and is endless.

The image scanner 12 (scanner) optically scans a document, and reads a document image (Step S101). The "document image" is an image of a document (typically, newspaper) on which a marking is put.

Figure 4:
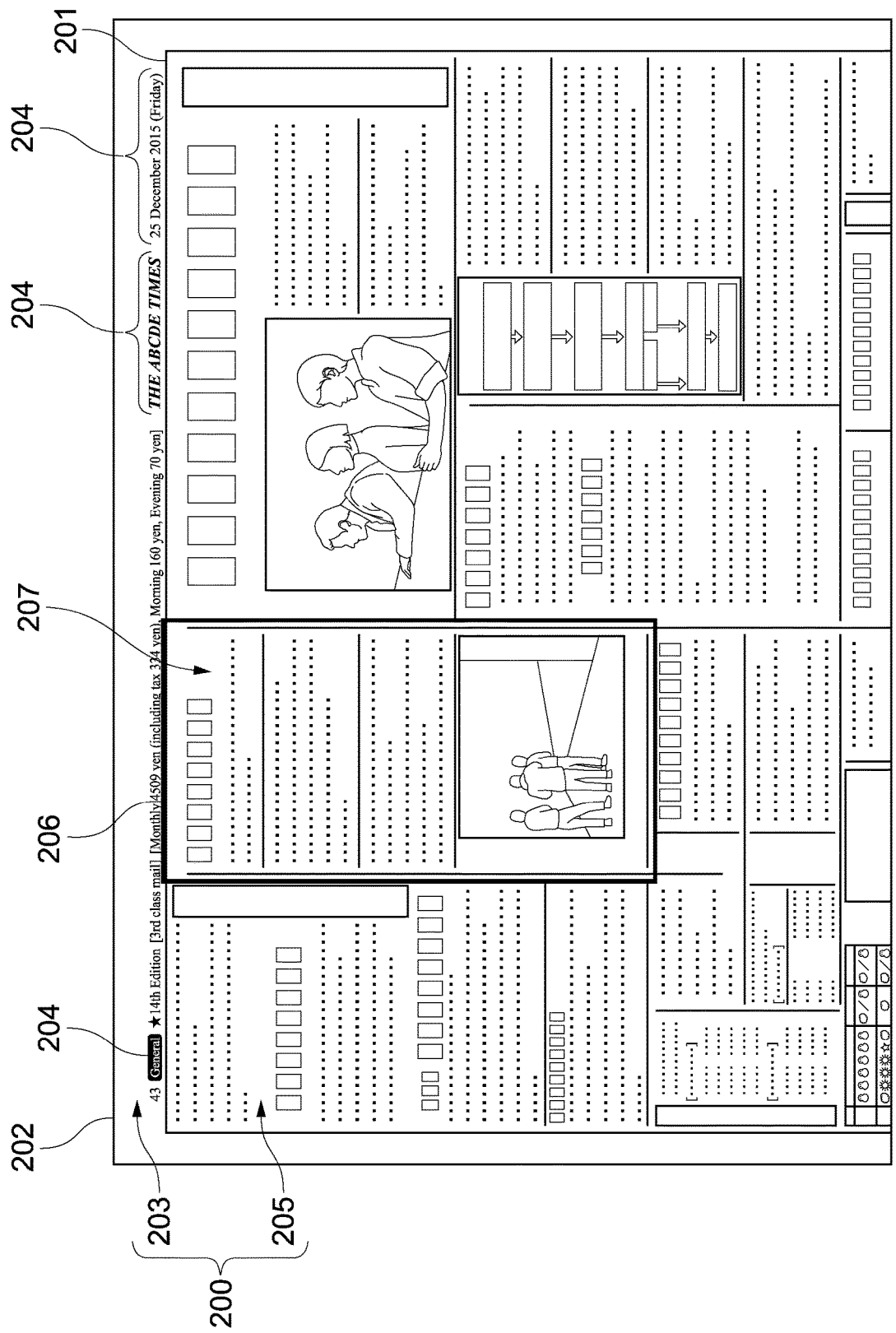
FIG. 4 shows a specific example of a document image.

FIG. 4 shows a specific example of a document image.

As shown in FIG. 4, a rule line 201 is on the upper portion of a document image 200, and a character string "43 General [star mark] 14th Edition [3rd class mail] [Monthly 4509 yen (including tax 334 yen) Morning 160 yen, Evening 70 yen] THE ABCDE TIMES 25 December 2015 (Friday)" is described between the rule line 201 and an edge 202 of the document image 200. An attribution area 203 is detected from the area between the rule line 201 and the edge 202 by a method to be described later. An attribution image 204 is an image of a character string representing attribution information, and is included in the attribution area 203. An article area 205 is an area other than the attribution area 203. A marking image 206 is an image of a line surrounding a part of the article area 205 (e.g., a part of articles included in the article area 205), and is shown by a thick line in FIG. 4. In the present embodiment, assumption is made that a user marks a part of the article area 205 by using a marker such as a fluorescent pen and a red pen. A marking area image 207 is an image of an area surrounded by the marking image 206.

The attribution area detection unit 101 detects the attribution area 203 from the document image 200 (YES in Step S102). The "attribution area" is an area that can include an image of a character string representing attribution information. The "attribution information" is information representing the name, issue date, and day of a newspaper, and/or the newspaper type (International, Economy, General, Sports, or the like). The attribution area detection unit 101 detects the attribution area 203 that is the area between the rule line 201 having a distance from the edge 202 (edge) of the document image 200 less than a threshold value and having a specific length (e.g., 90% or more of the length of the document image 200 in the same direction as the rule line 201) and the edge 202 of the document image 200, for example. This increases the possibility of accurately detecting the attribution area 203. The attribution area detection unit 101 cuts out, from the document image 200, the detected attribution area 203 (Step S103).

Note that the attribution area detection unit 101 may detect the area between the rule line 201 and the edge 202 of the document image 200 as the attribution area 203 in the case where an area between the edge 202 and a character string right above the rule line 201 is blank.

Further, the attribution area 203 may be an area between blank areas between the rule line 201 and the edge 202 of the document image 200. Note that the blank may have a length in the direction parallel to the rule line 201 not less than a specific length. In this case, the attribution area detection unit 101 detects, based on a predetermined specific length, an area between blanks before and after a word ("General" or the like in the example shown in FIG. 4) or a phrase ("THE ABCDE TIMES", "25 December 2015 (Friday)", or the like) above the rule line 201 shown in FIG. 4 as attribution area 203.

Further, the attribution area 203 may be an area between the two furthest blank areas among blank areas between the rule line 201 and the edge 202 of the document image 200. In this case, the attribution area detection unit 101 detects an area between blanks before and after "43 General [star mark] 14th Edition [3rd class mail] [Monthly 4509 yen (including tax 334 yen) Morning 160 yen, Evening 70 yen] THE ABCDE TIMES 25 December 2015 (Friday)" shown in FIG. 4 as the attribution area 203.

Note that the blank areas between the rule line 201 and the edge 202 of the document image 200 represent areas including no image of a character and the like between the rule line 201 and the edge 202 among areas between the rule line 201 and the edge 202.

In the case where the attribution area detection unit 101 detects the attribution area 203 based on the blank (or blank area) of the document image 200, the rule line 201 does not necessarily limited to a rule line having a distance from the edge 202 less than a threshold value.

Further, the attribution area detection unit 101 may or may not include, in the attribution area 203, blanks before and after a character string such as a word and a phrase, or blanks between the edge 202 and a character string such as a word and a phrase. In either case, it is one form of the attribution area 203 between the blank areas between the rule line 201 and the edge 202 of the document image 200.

Note that in the case of not detecting the attribution area 203 from the document image 200 (NO in Step S102), the attribution area detection unit 101 notifies a user of an error by, for example, displaying a retry requesting message on the display device 17a (Step S104).

The attribution image detection unit 102 detects, from the attribution area 203 cut out by the attribution area detection unit 101 from the document image 200, one or more attribution images 204 included in the attribution area 203. Each "attribution image" includes a character string representing the name, issue date, and day of a newspaper, and/or the newspaper type (international, economy, social, sports, or the like). The attribution image detection unit 102 extracts a plurality of characters from each of the detected attribution images 204. The "character" represents each character (each word depending on the language) included in the character string. Strictly speaking, it is an image of each character. The attribution image detection unit 102 refers to an OCR (Optical Character Recognition) database 111, and recognizes the plurality of extracted characters. Specifically, in the OCR database 111, image patterns of characters and character codes are registered in association with each other one by one. The attribution image detection unit 102 searches the OCR database 111 for an image pattern representing the extracted character, and acquires a character code associated with the image pattern obtained by the search. The attribution image detection unit 102 acquires character codes of all of the characters included in the attribution image 204. The attribution image detection unit 102 recognizes the character string by combining the respective character codes of all of the characters included in the character string (Step S105).

The attribution information extraction unit 103 extracts attribution information represented by the attribution image 204 by checking the character string included in the attribution image 204 against an attribution database 112 storing attribution information (YES in Step S106). As the "attribution information", typically, the name, issue date, and day of a newspaper, and/or the newspaper type (international, economy, social, sports, or the like) are recorded in the attribution database 112. In the attribution database 112, for example, general-purpose words (Press, Daily, Times, and the like) included in the name of the newspaper in addition to the name (proper noun) are recorded as the name of the newspaper. Accordingly, even in the case of recognizing a new character string (name as proper noun) that is not recorded in the attribution database 112, the attribution information extraction unit 103 can determine that it is the name of the newspaper as long as it is a character string including "daily report", for example. Then, the attribution information extraction unit 103 may store the character string including "daily report" in the attribution database 112 as a new name (proper noun) of a newspaper.

Note that in the case where the character string included in the attribution image 204 does not represent attribution information (i.e., typically, the name, issue date, and day of a newspaper, and/or the newspaper type) (NO in Step S106), the attribution information extraction unit 103 notifies a user of an error by, for example, displaying a retry requesting message on the display device 17a (Step S104).

Meanwhile, the marking detection unit 104 detects the marking image 206 from the article area 205 of the document image 200 (YES in Step S107). The "article area" represents an area excluding the attribution area 203 in the document image 200. Specifically, the marking detection unit 104 detects the marking image 206 that is an endless (closed figure such as a rectangle) image having a different intensity and saturation from those of the background (white or the like). The marking detection unit 104 may further detect, as the marking image 206, an image of a specific color (e.g., color corresponding to a marker) in the endless image.

Note that in the case of not detecting the marking image 206 from the document image 200 (NO in Step S107), the marking detection unit 104 notifies a user of a marking error by, for example, displaying a retry requesting message on the display device 17a (Step S104).

The marking area image generation unit 105 cuts out, from the document image 200, an image surrounded by the marking image 206 detected by the marking detection unit 104 to generate the marking area image 207 (Step S108).

The image recording unit 106 records the marking area image 207 generated by the marking area image generation unit 105 and the character string representing the attribution information extracted by the attribution information extraction unit 103 in the storage device 18 in association with each other (Step S109).

Figure 5:
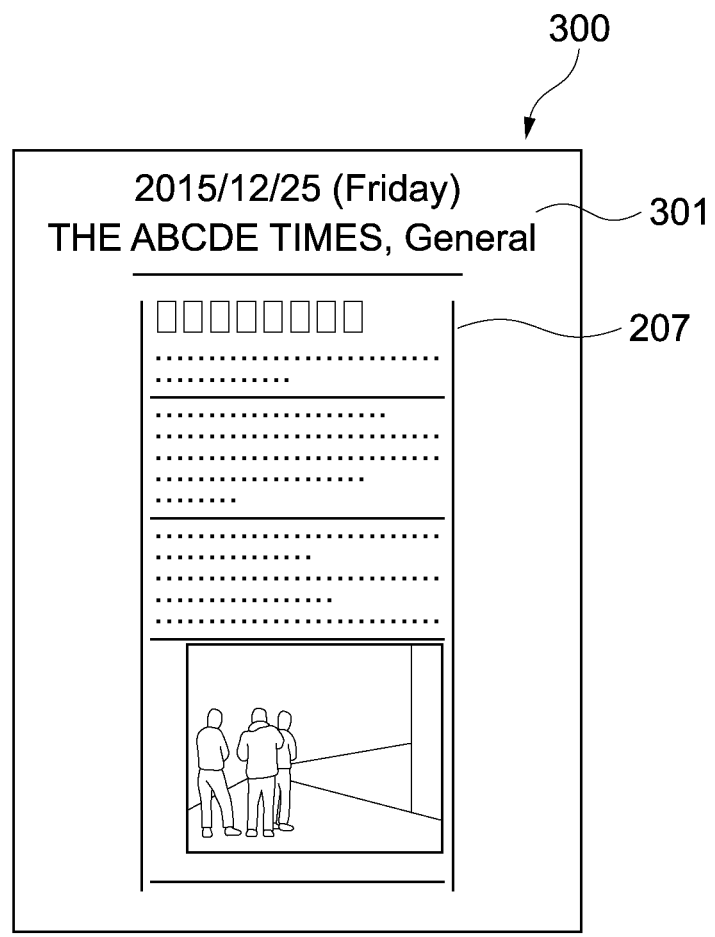
FIG. 5 shows a specific example of a combined image.

FIG. 5 shows a specific example of a combined image.

The combined image generation unit 107 combines the marking area image 207 generated by the marking area image generation unit 105 and s character string 301 (text) representing the attribution information extracted by the attribution information extraction unit 103 that are recorded in the storage device 18 in association with each other to generate a combined image 300 (Step S110). The combined image generation unit 107 outputs the generated combined image 300 to the image forming device 16, and causes the image forming device 16 to print the image (Step S111).

The image recording unit 106 records the marking area image and the character string representing the attribution information in the storage device 18 in association with each other. This makes it possible for a user to easily and efficiently perform newspaper clipping management later. Note that the image recording unit 106 may record a plurality of sets of marking area images and pieces of attribution information. In this case, the combined image generation unit 107 may combine a plurality of marking area images associated with the same attribution information (e.g., year and month, and newspaper type) and the character string representing the same attribution information among the plurality of sets of marking area images and pieces of attribution information to generate a combined image. Accordingly, for example, it is possible to generate one combined image by collecting articles of the same year and month with the same newspaper type, which improves user friendliness.

4. Modified Example

In the present embodiment, the combined image generation unit 107 combines the marking area image 207 and a character string (text) representing attribution information to generate the combined image 300. Alternatively, the combined image generation unit 107 may combine the marking area image 207 and the attribution image 204 detected by the attribution image detection unit 102 to generate a combined image (not shown).

In the present embodiment, a character string included in the attribution image 204 is recognized by OCR, and attribution information is extracted from the character string. Alternatively, the attribution information extraction unit 103 may extract attribution information by performing pattern recognition on the attribution image 204. According to this method, it is possible to extract attribution information also from the attribution image 204 (trademark, logo, or the like) including no character string.

In the case where the image scanner 12 reads, immediately after reading a document image, another document image, Step S102 to Step S107 (attribution information extraction) may be omitted, and a character string representing the same attribution information as that of the document image and the marking area image 207 cut out from the different document image may be recorded to generate a combined image.

In the present embodiment, the information processing apparatus is an image forming apparatus. Alternatively, the information processing apparatus may be a terminal apparatus such as a personal computer, a smartphone, a tablet computer. In this case, the terminal apparatus may receive a document image from an information processing apparatus (not shown) connected to a network, and transmit a combined image to an image forming apparatus.

In the present embodiment, the image scanner 12 reads a document image. Alternatively, the MFP 1 may receive, from an information processing apparatus (not shown) connected to a network, a document image via the network communication device 13

5. Conclusion

According to the present embodiment, a marking area image surrounded by marking put by a user is cut out, and attribution information is extracted from an attribution image outside a marking area.

As described above, in the present embodiment, it is possible for a user to automatically extract attribution information from the outside of a marking area. In other words, it is possible to reliably extract attribution information that cannot be acquired from an article (marking area), such as the date, the name of the newspaper, and the newspaper required for clipping creation management. Accordingly, it is possible for a user to easily and efficiently perform newspaper article clipping management.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a memory that stores an information processing program; and
    a processor that executes the information processing program, wherein
    when the processor executes the information processing program, the processor operates as
    an attribution area detection unit that detects an attribution area from a newspaper, wherein (i) the newspaper is composed of the attribution area and an article area, (ii) the attribution area includes an attribution image representing attribution information, and (iii) the attribution information includes information representing at least one of a name of the newspaper, an issue date of the newspaper, and a type of the newspaper,
    an attribution image detection unit that detects the attribution image included in the attribution area of the newspaper,
    an attribution information extraction unit that extracts the attribution information represented by the attribution image,
    a marking detection unit that detects a marking image from the article area, the article area being an area excluding the attribution area in the newspaper,
    a marking area image generation unit that generates, from the newspaper, a marking area image surrounded by the marking image, and
    a combined image generation unit that combines the marking area image and a character string representing the attribution information to generate a combined image, wherein
    the attribution area detection unit detects the attribution area in the newspaper between a rule line of the newspaper and an edge of the newspaper, a distance of the rule line from the edge of the newspaper being less than a threshold value, the rule line having a specific length, wherein
    the attribution image includes a character string that means a proper noun,
    the attribution image detection unit recognizes the character string that means the proper noun included in the attribution image by optical character recognition, and
    the attribution information extraction unit
        checks the character string that means the proper noun against a database at least storing a general-purpose word included in the proper noun, and
        where the character string that means the proper noun is a new character string that is not recorded in the database, and where the new character string includes a character string that means the general-purpose word,
        determines that the new character string means the proper noun,
        extracts the new character string as attribution information represented by the attribution image, and
        stores the new character string in the database.

2. The information processing apparatus according to claim 1, wherein
    when the processor executes the information processing program, the processor further operates as
    an image recording unit that records the marking area image and the character string representing the attribution information in association with each other.

3. The information processing apparatus according to claim 2, wherein
    the image recording unit records a plurality of sets of marking area images and character strings representing pieces of attribution information, and
    the combined image generation unit further combines a plurality of marking area images associated with a character string representing the same attribution information and the character string representing the same attribution information among the plurality of sets of marking area images and character strings representing pieces of attribution information recorded in the image recording unit to generate a combined image.

4. The information processing apparatus according to claim 1, further comprising an image forming unit that prints the combined image.

5. The information processing apparatus according to claim 1, further comprising
an image scanner that reads the newspaper from a document.

6. The information processing apparatus according to claim 1, wherein
the attribution area detection unit detects the attribution area in the newspaper between a rule line of the newspaper and an edge of the newspaper, a distance of the rule line from the edge of the newspaper being less than a threshold value, the rule line having a specific length, if an area between an edge of the newspaper and a character string right above the rule line is blank.

7. The information processing apparatus according to claim 1, wherein
the attribution area detection unit detects the attribution area in the newspaper between a rule line of the newspaper and an edge of the newspaper, a distance of the rule line from the edge of the newspaper being less than a threshold value, the rule line having a specific length, the attribution area being an area between blank areas between the rule line having the specific length and an edge of the newspaper.

8. The information processing apparatus according to claim 7, wherein
the blank areas between the rule line having the specific length and the edge of the newspaper are areas including no image of a character between the rule line having the specific length and the edge of the newspaper among areas between the rule line having the specific length and the edge of the newspaper.

9. The information processing apparatus according to claim 1, wherein
the attribution area detection unit detects the attribution area in the newspaper between a rule line of the newspaper and an edge of the newspaper, a distance of the rule line from the edge of the newspaper being less than a threshold value, the rule line having a specific length, the attribution area being an area between two furthest blank areas among blank areas between the rule line having the specific length and an edge of the newspaper.

10. A non-transitory computer readable recording medium that records an information processing program executable by a computer of an information processing apparatus, the information processing program causing the computer to operate as:
an attribution area detection unit that detects an attribution area from a newspaper, wherein (i) the newspaper is composed of the attribution area and an article area, (ii) the attribution area includes an attribution image representing attribution information, and (iii) the attribution information includes information representing at least one of a name of the newspaper, an issue date of the newspaper, and a type of the newspaper;
an attribution image detection unit that detects the attribution image included in the attribution area of the newspaper;
an attribution information extraction unit that extracts the attribution information represented by the attribution image;
a marking detection unit that detects a marking image from the article area, the article area being an area excluding the attribution area in the newspaper;
a marking area image generation unit that generates, from the newspaper, a marking area image surrounded by the marking image; and
a combined image generation unit that combines the marking area image and a character string representing the attribution information to generate a combined image, wherein
the attribution area detection unit detects the attribution area in the newspaper between a rule line of the newspaper and an edge of the newspaper, a distance of the rule line from the edge of the newspaper being less than a threshold value, the rule line having a specific length, wherein
the attribution image includes a character string that means a proper noun,
the attribution image detection unit recognizes the character string that means the proper noun included in the attribution image by optical character recognition, and
the attribution information extraction unit
checks the character string that means the proper noun against a database at least storing a general-purpose word included in the proper noun, and
where the character string that means the proper noun is a new character string that is not recorded in the database, and where the new character string includes a character string that means the general-purpose word,
determines that the new character string means the proper noun,
extracts the new character string as attribution information represented by the attribution image, and
stores the new character string in the database.

11. The non-transitory computer readable recording medium according to claim 10, wherein
the attribution area detection unit detects the attribution area in the newspaper between a rule line of the newspaper and an edge of the newspaper, a distance of the rule line from the edge of the newspaper being less than a threshold value, the rule line having a specific length, if an area between an edge of the newspaper and a character string right above the rule line is blank.

12. The non-transitory computer readable recording medium according to claim 10, wherein
the attribution area detection unit detects the attribution area in the newspaper between a rule line of the newspaper and an edge of the newspaper, a distance of the rule line from the edge of the newspaper being less than a threshold value, the rule line having a specific length, the attribution area being an area between blank areas between the rule line having the specific length and an edge of the newspaper.

13. The non-transitory computer readable recording medium according to claim 12, wherein
the blank areas between the rule line having the specific length and the edge of the newspaper are areas including no image of a character between the rule line having the specific length and the edge of the newspaper among areas between the rule line having the specific length and the edge of the newspaper.

14. The non-transitory computer readable recording medium according to claim 10, wherein the attribution area detection unit detects the attribution area in the newspaper between a rule line of the newspaper and an edge of the newspaper, a distance of the rule line from the edge of the newspaper being less than a threshold value, the rule line having a specific length, the attribution area being an area between two furthest blank areas among blank areas between the rule line having the specific length and an edge of the newspaper.

* * * * *